Aug. 10, 1971 — F. M. WELCH — 3,598,726
WATER TREATMENT APPARATUS AND METHOD
Filed Aug. 27, 1968 — 2 Sheets-Sheet 1

INVENTOR
FREDRICK M. WELCH
BY Roberts C. Sullivan
ATTORNEY

United States Patent Office 3,598,726
Patented Aug. 10, 1971

3,598,726
WATER TREATMENT APPARATUS AND METHOD
Fredrick M. Welch, Oconomowoc, Wis., assignor to Autotrol Corporation, Glendale, Wis.
Filed Aug. 27, 1968, Ser. No. 755,616
Int. Cl. C02c 1/04
U.S. Cl. 210—3                    7 Claims

ABSTRACT OF THE DISCLOSURE

An apparatus for and method of removing nutrients such as nitrates, phosphates or carbonaceous materials from water. The water to be treated is contacted by rotating disks having tapered surfaces. Algae are supplied to the water and are picked up by the rotating disks, being supported by the tapered surfaces of the disks. The algae on the disks are exposed to the combined effects of sunlight, either natural or artificial, and to an atmosphere of carbon dioxide ($CO_2$). The algae remove the nutrients from the water, and reduce the carbon dioxide present in the atmosphere above the liquid to oxygen ($O_2$).

BACKGROUND OF THE INVENTION

Field of the invention

This invention relates to an apparatus for and method of treating water such as waste water, sewage water, or the water of a river, lake or stream, to remove from such water nutrients which encourage the growth and multiplication of algae.

Description of the prior art

Waste water or sewage which has been subjected to a secondary or biological treatment step is usually discharged to a waterway such as a river, lake or stream. The waste water or sewage thus discharged to the waterway usually contains certain nutrients such as nitrogen, phosphorus and, to a lesser degree, carbonaceous materials. In a typical biological treatment step to which the dicharged waste water may have been subjected prior to being discharged into the waterway, the biological treatment step acted principally on carbonaceous materials present in the sewage being treated and only to a much lesser extent on the nitrogen and phosphorus in the sewage being treated. Thus, substantial amounts of nitrogen and phosphorus remain in the effluent discharged from the secondary or biological treatment step to the waterway. The discharged effluent may contain nitrates such as $NO_3$, $NO_2$, $NH_3$ (ammonia) or derivatives of ammonia, and phosphates such as $PO_4$.

The discharged nutrients such as the nitrates and phosphates just mentioned promote and encourage the growth and multiplication of algae in the waterway such as the river, lake or stream into which the effluent containing the nutrients is discharged. The algae and other equivalent aquatic plants create a serious nuisance from many standpoints. For example, the algae form a green scum on the surface of the water which is aesthetically undesirable. Also an excess of algae impairs fish life in the waterway. The algae remove the nitrogen, phosphorus and carbonaceous materials from the waterway in the presence of sunlight, utilizing $CO_2$ gas present in the atmosphere. This is a process which occurs naturally in all lakes, streams and other waterways.

Another problem created by algae is that during the night in the absence of sunlight the algae remove oxygen ($O_2$) from the water, which is undesirable since the removal of oxygen from the water is harmful to fish life. Furthermore, the algae die and drop to the bottom of the lake or waterway releasing nutrients such as nitrogen and phosphate or compounds thereof, which released nutrients cause further multiplication of the algae in the waterway.

SUMMARY OF THE INVENTION

Accordingly, it is an object of this invention to provide an apparatus for and a method of removing nutrients from water such as waste water or the water of a waterway, whereby to reduce the nuisance of algae in the waterway.

It is another object of the invention to provide an apparatus for and method of providing a controlled removal of nutrients from water such as waste water or the water of a waterway, which prevents the uncontrolled growth of algae in the waterway.

It is another object of the invention to provide an apparatus and method which simulates the naturally occurring process by which algae remove nutrients from a waterway, but which functions in a manner permitting control and disposal of the algae required and produced in connection with the apparatus and method.

In achievement of these objectives, there is provided in accordance with an embodiment of this invention an apparatus for and method of removing nutrients such as nitrates, phosphates or carbonaceous materials from water in accordance with which the water to be treated is contacted by rotating disks having tapered surfaces, algae being supplied to the water and being picked up by the rotating disks and supported by the tapered surfaces of the disks. The algae on the disks are rotated above the surface of the water and are exposed to the combined effects of sunlight, either natural or artificial, and to an atmosphere of carbon dioxide ($CO_2$). As a result of subjecting the algae to the combined effects of sunlight (natural or artificial) and to the atmosphere of $CO_2$, the algae remove the nutrients from the water. Furthermore, the algae reduce the carbon dioxide present in the atmosphere above the liquid to oxygen ($O_2$).

Further objects and advantages of the invention will become apparent from the following description taken in conjunction with the accompanying drawing in which:

DESCRIPTION OF THE PREFERRED EMBODIMENT

Figure 1:
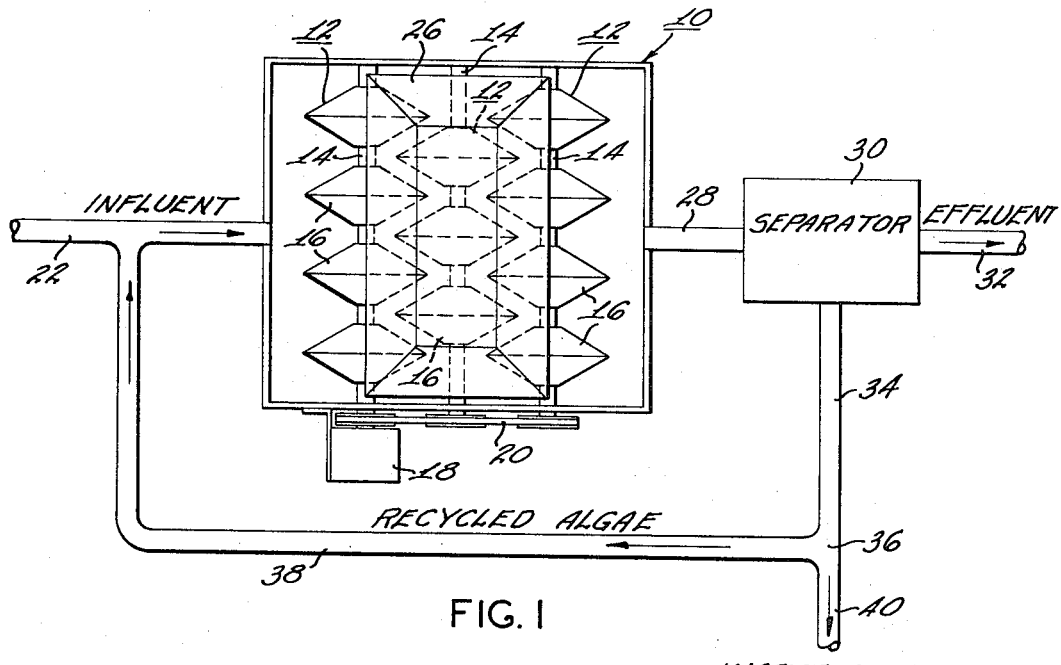
FIG. 1 is a schematic view of one embodiment of the apparatus and method of the invention.
Figure 3:
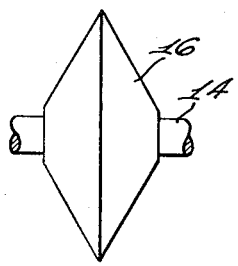
FIG. 3 is an enlarged view of one of the rotating disks of FIG. 1.

Referring now to the drawings and more particularly to FIG. 1, there is shown a treatment tank generally indicated at 10 including a plurality of rotating two-phase contactor disk assemblies generally indicated at 12. Each disk assembly 12 comprises a shaft 14 on which are mounted a plurality of spaced disks 16 having tapered outer surfaces as best seen in FIG. 3. As will be explained in more detail hereinafter, the purpose of the tapered surface of the disks is to allow the algae which are picked up from the liquid suspension by the rotating disks to be exposed to sunlight-type radiation and to a gas containing $CO_2$. In the embodiment shown in FIG. 1, three tapered disk assemblies 12 are shown and are driven by any suitable drive means such as a variable speed motor 18 either directly or through a drive chain 20. To conserve space, the disks 16 on the respective shafts 14 may be offset with respect to the disks on adjacent shafts, whereby to permit interleaving of the respective tapered disk assemblies as best seen in the view of FIG. 1.

Figure 2:
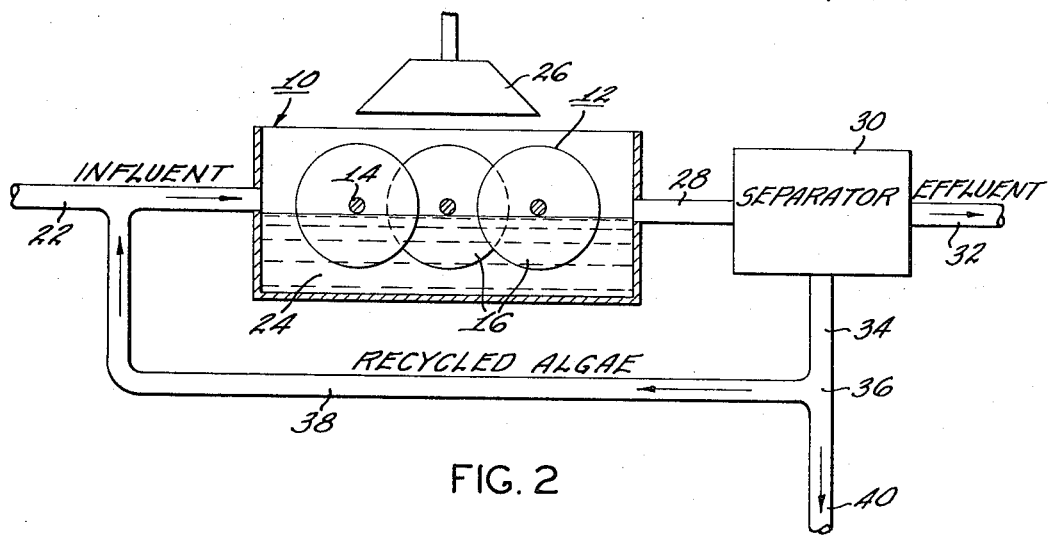
FIG. 2 is an elevation view partly in section, of the apparatus of FIG. 1.

An influent of waste water or treated sewage is supplied by means of conduit 22 to the treatment tank 10, the rate of flow being adjusted so that the disks 16 are partially immersed in the body of liquid 24 in tank 10. Preferably, the level of the liquid 24 in the treatment tank 10 should be maintained at a level such that substantially the lower half of the disks 16 is immersed in the liquid 24 while the upper half rotates through a gaseous atmosphere above the level of liquid 24. In the embodiment of FIGS. 1 and 2, treatment tank 10 is open at its upper end to the ordinary ambient atmosphere which contains gaseous $CO_2$. A source of artificial sunlight generally indicated at 26 is positioned above the tapered disk assemblies 12 in such a manner that the portion of the disks 16 rotating above the level of liquid 24 in the treatment tank 10 receives radiant energy from the artificial light source 26 when light source 26 is energized. If treatment tank 10 and the tapered disk assemblies 12 positioned therein are located where the natural sunlight can reach the tapered surfaces of disks 16 during daylight hours, then the artificial source of sunlight 26 need be energized only during periods when the natural sunlight is not available. The source of artificial sunlight 26 may be, for example, of the type manufactured and sold by Sylvania Electric Products, Incorporated under the name "Gro-Lux," as described in brochure FL–739, (1967), published by Sylvania Electric Products, Incorporated, Lighting Division, Danvers, Massachusetts. A plurality of such lamps may be provided, if required.

A supply of algae is seeded into liquid 24 in tank 10. As disks 16 rotate through liquid 24, they pick up algae on the tapered surfaces thereof and carry the algae into the upper portion of tank 10 above the level of liquid 24 where the algae are exposed to the combined effects of either the natural sunlight or the sunlight from source 26 and are also exposed to the $CO_2$ present in the atmosphere above liquid 24.

As a result of subjecting the algae to the combined effects of sunlight, either natural or artificial, and to an atmosphere of $CO_2$ as just described, the algae are capable of removing nutrients, such as nitrogen, phosphorus and carbonaceous materials from the solution 24 in tank 10.

As a further result of the algae being exposed to the natural or artificial sunlight, to the nutrients in treatment tank 24, and to the $CO_2$ atmosphere above the liquid level 24, the $CO_2$ will be reduced to $O_2$ and new algae cells will be created which will then be able to absorb and use more nutrients and $CO_2$. This is in accordance with the well known process of photosynthesis. (See Van Nostrand's Scientific Encyclopedia, Third Edition, D. Van Nostrand Company, Incorporated, Princeton, N.J., 1958, pages 1241, 1242.)

The treated liquor or mixed liquor emerges from treatment tank 10 by means of conduit 28 and enters a separator device generally indicated diagrammatically at 30 which separates the algae from the liquid component. The separator device 30 may consist, for example, of an air floatation unit similar to that described at page 184 of the book entitled Biological Waste Treatment, by W. W. Eckenfelder and D. J. O'Connor, published by Pergamon Press, New York, N.Y., copyright 1961. Alternatively, the separator device may consist of a suitable centrifugal device which separates the algae from the liquid, or may consist of a suitable screening device. The liquid effluent emerging from the separator 30 passes by conduit 32 to a suitable discharge point such as a waterway or the like. The separated algae are conducted by conduit 34 to a junction point 36. Part of the algae reaching junction point 36 passes through conduit 38 back to the influent or input conduit 22 and pass into treatment tank 10, where the algae are reused in the process previously described. However, an excess of algae may be generated by the process previously described, so that the excess algae passing from separator 30 through conduit 34 passes junction 36 and through conduit section 40 to a suitable collection point. This excess algae has a high protein content and may be used as an animal feed or fertilizer.

A suitable pump or pumps such as a slurry pump, or the like (not shown) may be provided to propel the algae through the various conduits 34, 38 and 40.

Figure 4:
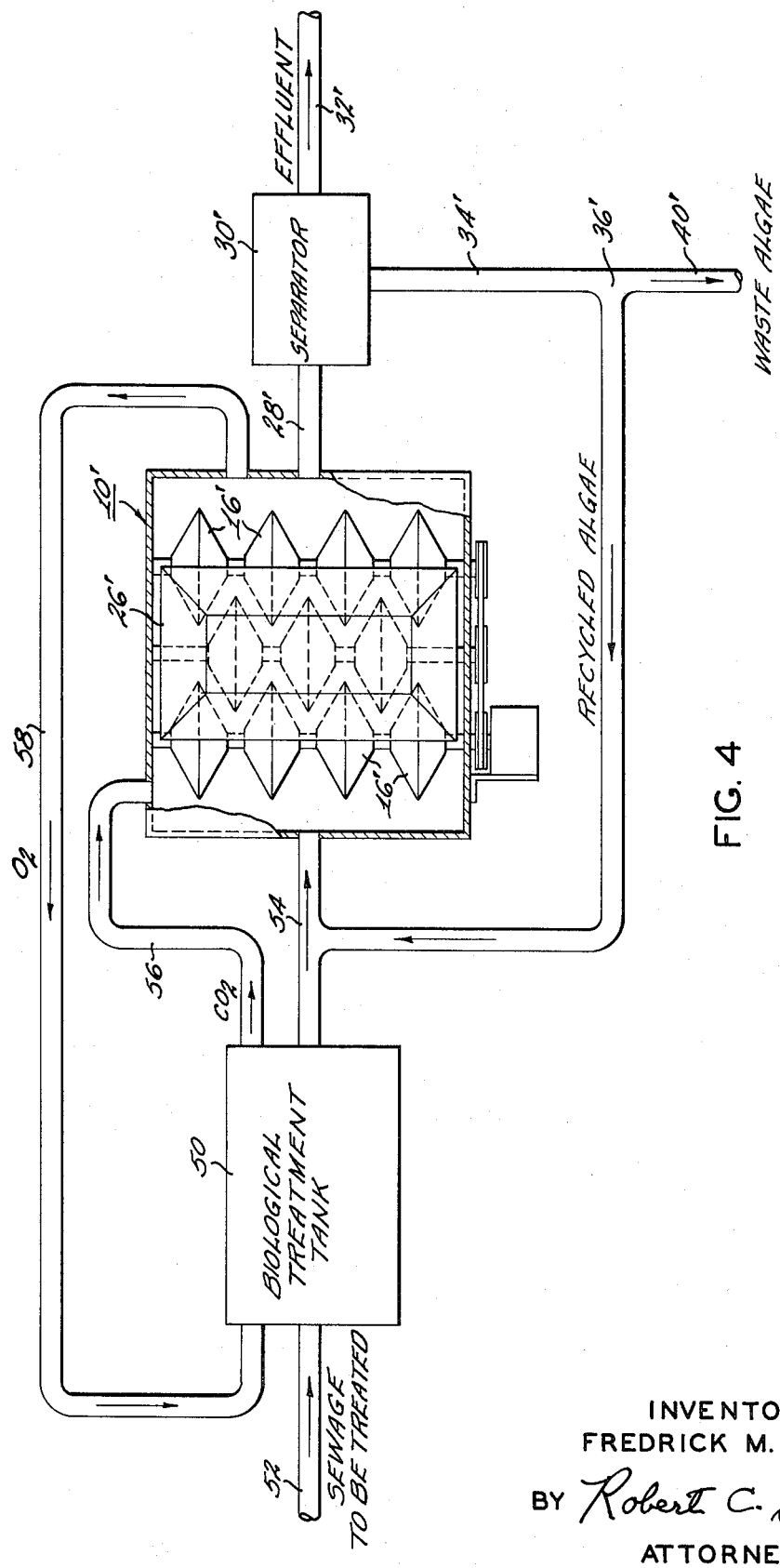
FIG. 4 is a diagrammatic view of a water treatment system similar to that shown in FIG. 1 but further including a biological treatment tank which delivers $CO_2$ to the algae treatment tank, and also further including means for delivering $O_2$ from the algae treatment tank to the input of the biological treatment tank.

There is shown in FIG. 4 a schematic diagram of a waste water treatment system generally similar to that described in connection with FIGS. 1 and 2 but in which the treatment tank 10' is closed at the upper end thereof and receives its carbon dioxide ($CO_2$) supply from some source other than the ambient atmosphere. A further feature of the system of FIG. 4 is the return of the oxygen ($O_2$) generated in the treatment tank 10' to the input of the biological treatment tank 50.

Referring now to FIG. 4, there is shown a biological treatment tank generally indicated at 50 which may contain any suitable type of aerobic biological treatment method or apparatus for waste water or sewage. For example, the biological treatment tank 50 may house an activated sludge process, well known in the sewage treatment art, or may have therein a rotating biological contactor apparatus of the type shown by British Pat. No. 935,162, issued to Hans Hartmann, on Aug. 28, 1963. The sewage to be treated is admitted to aerobic biological treatment tank 50 through conduit 52 and the mixed liquor emerging from treatment tank 50 passes by conduit 54 to the input end of algae treatment tank 10' which is similar to the treatment tank 10 of FIGS. 1 and 2 and will not be described again.

The tank 10' is not open to atmosphere and hence does not receive natural sunlight. A source of artificial sunlight 26' similar to that previously described in connection with the embodiment of FIGS. 1 and 2 is provided inside tank 10' above the liquid level therein and supplies radiant energy to the algae on the surfaces of the tapered disks 16' rotating within the treatment tank 10'.

A natural byproduct of any aerobic biological sewage treatment process in treatment tank 50 is the production of gaseous $CO_2$, and hence the $CO_2$ output from biological treatment tank 50 is conducted by conduit 56 to the input end of treatment tank 10'. Also, the oxygen ($O_2$) produced by the removal of carbon (C) from the $CO_2$ in algae treatment tank 10' produces free $O_2$ which is conducted by conduit 58 from algae treatment tank 10' to the input end of biological treatment tank 50, thus supplying gaseous oxygen used in the aerobic biological treatment process which occurs within biological treatment tank 50.

An advantage of supplying $CO_2$ gas to the algae treatment tank 10' from some source other than the atmosphere is that a higher concentration of $CO_2$ can be supplied in this manner, thereby accelerating the photosynthesis process, resulting in an increased production of algae in tank 10' and an increased rate of removal of nutrients from the water being treated.

For example, instead of having the algae treatment tank 10 open to the atmosphere, as in FIGS. 1 and 2, and instead of having the algae treatment tank closed and connected to the aerobic biological treatment tank 50, as in FIG. 4, the algae treatment tank could be closed and connected to a suitable $CO_2$ generator. $CO_2$ generators are well known. For example, a suitable $CO_2$ generator for this purpose is manufactured by Demarkus Manufacturing Company. Reference is also made in this connection to the article on "Carbon Dioxide" in Kirk-Othmer Encyclopedia of Chemical Technology, volume 4, John Wiley and Sons, Incorporated, 1964, pages 353–369.

The effluent or mixed liquor which emerges from algae treatment tank 10' passes through conduit 28 to the separator 30' which is similar to the separator 30 described in connection with the embodiment of FIGS. 1 and 2. The separator 30' may contain an air floatation unit similar to that previously described in connection with the embodiment of FIGS. 1 and 2, a screening device, or a centrifugal device to remove and separate the algae from the liquid component of the mixed liquor which enters separator 30'. The liquid component of the mixed liquor from which the algae has been separated passes outwardly through conduit 32' to a suitable discharge point such as a waterway or the like. The separated algae passes outwardly from separator 30' through conduit 34', passing to junction 36', where a major portion of the separated algae is returned through conduit 38' to the treatment tank 10' for reuse, while the excess algae passes through conduit 40' to a suitable collection point. A suitable pump or pumps such as a slurry pump or the like (not shown) may be provided to propel the algae through the various conduits 34', 38' and 40'.

The oxygen output from the processes shown in FIGS. 1 and 2 or in FIG. 4 could be used for producing oxygen in a ship, submarine or the like with the oxygen produced as a product of the removal of the carbon (C) from the $CO_2$ by the algae being a source of oxygen for the ship, submarine, or the like.

The apparatus and method, particularly as shown in the embodiment of FIGS. 1 and 2, could be used for removing nutrients from lakes which have been polluted by surface runoff or by waste treatment effluents which are causing increased aging of the lake. For this purpose, the influent line 22 of FIGS. 1 and 2 might be connected directly to the lake and lake water could be pumped through the influent line 22 to the algae treatment tank 10, the treated water being discharged as the effluent through conduit 32 back into the lake.

While there have been shown and described particular embodiments of the invention, it will be obvious to those skilled in the art that various changes and modifications may be made without departing from the invention and, therefore, it is aimed to cover all such changes and modifications as fall within the true spirit and scope of the invention.

The embodiments of the invention in which an exclusive property or privilege is claimed are defined as follows:

1. A method of treating waste water or the like which comprises passing said waste water into a first tank, subjecting said waste water to aerobic biological treatment in said first tank, conducting the effluent from said first tank to a second tank, said effluent containing nutrients, contacting said effluent in said second tank with algae in the presence of carbon dioxide gas and light to remove nutrients from said effluent, and conducting to said first tank oxygen gas evolved by the treatment in said second tank.

2. An apparatus for removing nutrients from water comprising a treatment tank, two-phase contactor disk means mounted for rotation in said tank, said disk means including a surface adapted to support algae thereon, said tank containing nutrient-containing water, means for rotating said disk means to alternately move a given portion of said surface of said disk means into a first phase in which said given portion of said surface and the algae thereon are in contact with said water and into a second phase in which said given portion of said surface and the algae thereon are in contact with an atmosphere containing carbon dioxide gas and are exposed to light, said surface of said disk means being tapered to provide increased surface area for supporting algae in exposed relation to said light and in contact with said carbon dioxide gas.

3. An apparatus as defined in claim 2 in which said surface is exposed to natural sunlight.

4. An apparatus as defined in claim 2 including an artificial source of sunlight directed toward said surface.

5. An apparatus for treating waste water comprising an aerobic biological treatment tank, means for introducing waste water into said biological treatment tank, whereby said water is subjected to aerobic biological treatment, a second treatment tank, means for conducting effluent from said biological treatment tank as a liquid influent into said second treatment tank, two-phase contactor means mounted for movement in said second treatment tank, said two-phase contactor means including a surface adapted to support algae thereon, means for alternately moving said two-phase contactor means into a first phase in which said surface and algae supported thereon are in contact with said liquid, and into a second phase in which said surface and algae supported thereon are in contact with an atmosphere containing carbon dioxide gas and are exposed to light, oxygen gas being evolved in said second treatment tank, and means for conducting said oxygen gas from said second treatment tank to said biological treatment tank.

6. A method of treating waste water or the like which comprises passing said waste water into a first tank, subjecting said waste water to aerobic biological treatment in said first tank, conducting the effluent from said first tank to a second tank, said effluent containing nutrients, contacting said effluent in said second tank with algae in the presence of carbon dioxide gas and light to remove nutrients from said effluent, collecting carbon dioxide gas which separates from the effluent of said first tank, and conducting to said second tank the carbon dioxide gas which is so collected.

7. An apparatus for treating waste water comprising an aerobic biological treatment tank, means for introducing waste water into said biological treatment tank whereby said water is subjected to aerobic biological treatment, carbon dioxide gas being evolved from the biological treatment in said biological treatment tank, a second treatment tank, means for conducting effluent from said biological treatment tank as a liquid influent into said second treatment tank, two-phase contactor means mounted for movement in said second treatment tank, said two-phase contactor means including a surface adapted to support algae thereon, means for alternately moving said two-phase contactor means into a first phase in which said surface and algae supported thereon are in contact with said liquid, and into a second phase in which said surface and algae supported thereon are in contact with an atmosphere containing carbon dioxide gas and are exposed to light, means for collecting carbon dioxide gas which separates from the effluent of said biological treatment tank, and means for conducting carbon dioxide gas so collected from said biological treatment tank to said second treatment tank.

References Cited

UNITED STATES PATENTS

| | | | |
|---|---|---|---|
| 2,559,704 | 7/1951 | Bevan | 210—11 |
| 2,867,945 | 1/1959 | Gotaas et al. | 210—15X |
| 3,188,288 | 6/1965 | Smith | 210—11 |
| 3,335,081 | 8/1967 | El-Naggar | 210—17X |
| 3,462,360 | 8/1969 | McKinney | 210—11 |
| 2,715,795 | 8/1955 | Pallotta et al. | 47—58 |
| 2,798,042 | 7/1957 | Cox | 210—17X |

FOREIGN PATENTS

| | | | |
|---|---|---|---|
| 935,162 | 8/1963 | Great Britain | 210—17 |

OTHER REFERENCES

Buswell, A. M., The Chemistry of Water and Sewage Treatment, 1928, The Chemical Catalog Co., Inc., New York, pp. 337–343, relied on.

MICHAEL ROGERS, Primary Examiner

U.S. Cl. X.R.

47—1.4; 210—11, 17, 151, 195